(12) United States Patent
Duernegger (10) Patent No.: US 10,840,772 B2
(45) Date of Patent: Nov. 17, 2020

(54) HAND HELD MACHINE TOOL

(71) Applicant: C. & E. Fein GmbH, Schwaebisch Gmuend-Bargau (DE)

(72) Inventor: Wolfgang Duernegger, Schorndorf (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 21 days.

(21) Appl. No.: 16/374,298

(22) Filed: Apr. 3, 2019

(65) Prior Publication Data

US 2019/0305640 A1    Oct. 3, 2019

(30) Foreign Application Priority Data

Apr. 3, 2018  (DE) .................... 10 2018 107 808

(51) Int. Cl.

| H02K 9/06 | (2006.01) |
|---|---|
| B25F 5/00 | (2006.01) |
| H02K 7/14 | (2006.01) |
| B23Q 11/12 | (2006.01) |
| B24B 23/02 | (2006.01) |
| B24B 55/10 | (2006.01) |

(52) U.S. Cl.
CPC ............. *H02K 9/06* (2013.01); *B23Q 11/127* (2013.01); *B24B 23/02* (2013.01); *B24B 23/028* (2013.01); *B25F 5/008* (2013.01); *H02K 7/145* (2013.01); *B24B 55/102* (2013.01)

(58) Field of Classification Search
CPC ..... B23Q 11/127; B24B 23/02; B24B 23/028; B24B 55/102; B25F 5/008; H02K 7/145; H02K 9/06

USPC .......................................................... 310/58

See application file for complete search history.

(56) References Cited

U.S. PATENT DOCUMENTS

| 6,570,276 B1* | 5/2003 | Morel .................... F04D 25/082 |
|---|---|---|
| | | 310/52 |
| 8,348,727 B2 | 1/2013 | Trautner et al. |
| 8,698,362 B2 | 4/2014 | Esenwein et al. |
| 10,044,245 B2 | 8/2018 | Bekavac |

(Continued)

FOREIGN PATENT DOCUMENTS

| DE | 8632779 U1 | 2/1987 |
|---|---|---|
| DE | 102004063751 A1 | 7/2006 |

(Continued)

*Primary Examiner* — Alex W Mok
(74) *Attorney, Agent, or Firm* — Muncy, Geissler, Olds & Lowe, P.C.

(57) ABSTRACT

A hand held machine tool for machining workpieces, comprising a housing in which a motor driving a rotor shaft is accommodated, and having an air guide region formed in the housing for supplying cooling air to the motor along a main flow direction oriented substantially parallel to the motor longitudinal axis. The air guidance region is limited at one end by at least one air inlet and at the other end by at least one air outlet for discharging the cooling air from the housing. A separator is arranged in the air guide region for dividing the cooling air into an outer partial air flow flowing around the outer circumference of the motor and into an inner partial air flow flowing through the motor. The separator is formed such that a degree of contamination of the outer partial air flow is greater than a degree of contamination of the inner partial air flow.

17 Claims, 5 Drawing Sheets

(56) References Cited

U.S. PATENT DOCUMENTS

| | | | | |
|---|---|---|---|---|
| 2004/0263008 | A1* | 12/2004 | Voigt | H02K 9/06 |
| | | | | 310/58 |
| 2006/0022529 | A1* | 2/2006 | De Filippis | F04D 25/082 |
| | | | | 310/58 |
| 2011/0148227 | A1 | 6/2011 | Schuele et al. | |
| 2013/0091815 | A1* | 4/2013 | Smith | A47L 9/106 |
| | | | | 55/346 |
| 2015/0143657 | A1* | 5/2015 | Gindele | A01G 20/47 |
| | | | | 15/330 |
| 2015/0336238 | A1 | 11/2015 | Copeland et al. | |

FOREIGN PATENT DOCUMENTS

| | | |
|---|---|---|
| DE | 102013209061 A1 | 11/2014 |
| DE | 212013000108 U1 | 11/2014 |
| EP | 2326465 A1 | 6/2011 |
| EP | 2527099 A1 | 11/2012 |
| WO | WO2009059863 A1 | 5/2009 |
| WO | WO2018208235 A1 | 11/2018 |

\* cited by examiner

HAND HELD MACHINE TOOL

This nonprovisional application claims priority under 35 U.S.C. § 119(a) to German Patent Application No. 10 2018 107 808.0, which was filed in Germany on Apr. 3, 2018, and which is herein incorporated by reference.

BACKGROUND OF THE INVENTION

Field of the Invention

The present invention relates to a hand held machine tool for machining workpieces, having a housing in which a motor driving a rotor shaft is accommodated, and having an air guide region formed in the housing for supplying cooling air to the motor along a main flow direction oriented substantially parallel to a motor longitudinal axis, wherein the air guide region is limited at one end by at least one air inlet and at the other end by at least one air outlet for discharging the cooling air from the housing.

Description of the Background Art

Such hand held machine tools, such as angle grinders, are often used for machining metal surfaces. In this case, however, the problem arises that chips and other dirt particles produced during the surface treatment can enter into the interior of the hand held machine tool and in particular agglomerate into clusters in the region of the motor, which can lead to damage to the motor. In addition, the chips resulting from the machining of metal surfaces are electrically conductive, so that there is also a risk of electrical short circuits which are associated with the risk that electricity or voltage is applied to the housing of the machine tool itself, which involves danger for the user of such hand held machine tools.

From EP 2 326 465 B1, which corresponds to US 2011/0148227, a hand held machine tool is known, in which the cooling air is deflected, for example, by a spiral. As a result, the dirt particles entrained in the air are forced to the edge of the spiral and either collected or passed through an outlet from the housing of the hand held machine tool. However, it has proven to be disadvantageous that along with the discharge of the dirt particles, at the same time a part of the cooling air is discharged from the system, which, however, adversely affects the cooling performance of the motor, so that ultimately the fan must be designed larger.

SUMMARY OF THE INVENTION

It is therefore an object of the present invention to reduce the above-mentioned disadvantages and to provide a hand held machine tool that ensures the simplest possible cooling of the motor and at the same time ensures that dirt particles contained in the cooling air do not adversely affect the service life of the motor.

This object is achieved according to an exemplary embodiment of the present invention with a hand held machine tool of the type mentioned above in that in the air guide region, a separator is arranged for dividing the cooling air into a partial air flow flowing around the outer circumference of the motor and an inner partial air flow flowing through the motor, and that the separator is designed such that the degree of contamination of the outer partial air flow is greater than the degree of contamination of the inner partial air flow.

As a result, it is ensured that the partial air flow flowing through the interior of the motor configured as, for example, an EC motor, is comparatively clean in comparison to the outer partial air flow, so that damage to the motor, in particular in the area of the pole windings, can be avoided. By means of the separator, the dirt particles contained in the cooling air are thus concentrated in the outer partial air flow, which can flow around the outer circumference of the motor. In this area, the motor is comparatively insensitive to dirt particles, so that the risk of damaging the motor even with an increased degree of contamination in the outer partial air flow is low. Thus, by dividing the cooling air into the outer partial air flow and the inner partial air flow, and by concentrating the dirt particles in the outer partial air flow, damage to the motor can be avoided in a particularly simple manner. In addition, since no dirt particles have to be discharged separately from the machine tool, which would be associated with a loss of cooling capacity, by concentrating the dirt particles in the outer partial air flow, the cleaning of the internal partial air flow does not adversely affect the cooling performance of the machine tool according to the invention. Rather, the dirt particles contained in the outer partial air flow are discharged out of the housing together with the outer partial air flow through the at least one air outlet. Dirt particles are particles with a diameter larger than 1.5 µm. In addition to EC motors, other motors, in particular other electric motors can be used in the invention.

The separator can be formed as a separator disk, which is arranged upstream of the motor in the main flow direction and is connected in a rotationally fixed manner to the rotor shaft. Due to the rotating separator disk, a radially outwardly acting force acts on the dirt particles contained in the cooling air, which causes the dirt particles to be moved outwards, radially away from the interior of the motor, before separation into the inner partial air flow and the outer partial air flow. In addition, it is also possible to integrate at least one permanent magnet in the separator disk, whereby it is ultimately possible, for example in combination with a Hall sensor, to detect the direction of rotation of the motor. In the context of the invention, however, it is also provided that the separator disk can be statically formed, that is, it does not move with the rotor shaft. It is also provided that the separator is not formed as a disk, but has a different geometric shape.

The housing can be formed in several parts and comprises a motor housing accommodating the motor, which at its end facing away from the motor has at least one inner opening and at least one outer opening that are radially spaced from one another. Through the inner openings, the inner partial air flow can be supplied to the interior of the motor, while the outer partial air flow is guided through the outer openings past the outside circumference of the motor.

In this context, it has proven particularly useful if the area ratio of the sum of the areas of the at least one inner opening to the sum of the areas of the at least one outer opening is between 1:1.5 and 1:0.75 and particularly preferably is at 1:0.9. By determining the area ratios between the inner openings and the outer openings, the flow of the cooling air can be selectively controlled, wherein the total cooling capacity of the machine tool can be optimized in particular with an area ratio of 1:0.9.

The at least one inner opening and/or the at least one outer opening can be designed as a ring-segmented slot. Due to the ring-segmented slot shape of the inner openings and/or the outer openings, the cooling air can be particularly easily supplied to the motor. In addition, this example also has manufacturing advantages, since as a result of this, in particular, the distance between the outer openings and the outer wall of the motor housing can be kept constant. As a result, manufacturing-induced vulnerabilities in the motor housing are avoided.

The at least one inner opening can be fluid-conductively connected to an inner overflow channel and if the at least one outer opening is fluid-conductively connected to an outer overflow channel. By using the inner and outer overflow channels, the cooling air can be passed through and around the motor and be particularly easily supplied to the areas that are in particular need of cooling.

The inner overflow channels can be formed between the pole windings of the motor and if the outer overflow channels can be formed on the outer peripheral side of the motor. In particular, in this case, the outer overflow channels can be at least partially formed by the outer circumference of the motor itself. The individual outer overflow channels can be separated from one another by guide ribs, which are formed on the inner circumference of the motor housing and provide a guide for the motor. This ensures that the dirt particles contained in the outer partial air flow are effectively discharged without clustering, without coming into contact with areas of the motor that they might damage.

An extension having an annular collar can be formed on the end face of the motor housing facing the air inlet, and if the separator has a recess accommodating the annular collar on the end facing away from the air inlet, for forming an air gap guiding the inner partial air flow between the housing and the separator. The air gap, the inlet of which is formed between the annular collar formed on the extension and the recess accommodating the annular collar, ensures that the inner partial air flow is as free as possible of impurities. The inlet of the air gap connected to the inner openings is arranged such that dirt particles contained in the cooling air do not enter the air gap itself, but are deflected at the area formed between the extension and the annular collar in the direction of the outer openings and are fed to the outer partial air flow and are ultimately guided past the motor around its outer circumference by means of said air flow. In the context of the invention, it is provided that the extension having the annular collar is either formed integrally with the motor housing or is made of several parts. The annular collar can be designed as a separate, disk-shaped component, while the extension is formed integrally with the motor housing. This has manufacturing advantages.

A ratio between the width of the air gap and the height of the air gap can be 3:4, and/or a ratio between the height of the extension and the radial extent of the annular collar can be 4:3. The height of the air gap is defined as the radial distance between the annular collar and the wall of the recess formed in the separator disk, and the width of the air gap is determined by the axial distance between the end face of the annular collar and the bottom of the recess. The height of the extension in turn is defined by the distance between the end face of the motor housing, which faces the air inlet, and the side of the annular collar facing said end face. By choosing the above-mentioned ratios, it is achieved that the air flow flowing through the air gap, which ultimately forms the inner partial air flow, is as free as possible of impurities. In particular, a dirt guide is thereby provided, which specifically does not permit dirt particles to penetrate into the air gap between the motor housing and the separator, but rather to be supplied to the outer partial air flow and passed through the outer openings around the outer peripheral side of the motor.

In order to keep the air of the inner partial air flow particularly clean, a reversal region can be formed between the housing and the separator, in which the flow direction of the inner partial air flow is directed counter to the main flow direction. This also means that as few dirt particles as possible get into the inner partial air flow, which has a positive effect on the life of the engine.

A filter structure providing a filter function, the openings of which have a size which can be between 100 μm and 300 μm, can be arranged in the region of the at least one air inlet. The filter structure ensures that a large portion of the dirt particles occurring during use of the machine tool do not get into the interior of the machine tool in the first place. The filter structure can be realized in particular as a porous, amorphous material or as a filter with uniformly arranged openings.

A control electronics for driving the motor can be provided, which is separated from the air guide region, and if an electronics cooling section is formed between the air inlet and the separator, in which a heat sink connected in a thermally conducting manner to the control electronics is arranged. Thus, it is possible to isolate the control electronics in itself from the air flow of the cooling air, so that in this way metallic dirt particles are ultimately prevented from damaging the control electronics of the machine tool. At most, these impurities encounter the heat sink arranged in the electronics cooling section, which in a preferred embodiment is made of aluminum. The cooling fins of the heat sink are advantageously arranged in parallel with the main flow direction.

A cable duct separated from the outer partial air flow can be formed in the motor housing for channeling out the motor-contacting connection cables from the motor housing. In this way it can be ensured that the connection cables do not come into contact with the dirt particles contained in the outer partial air flow. On the one hand, this prevents the connection cables from being damaged by the dirt particles and, on the other hand, it prevents the dirt particles from attaching themselves to the connection cables, which would lead to clustering that would reduce the continuity of the overflow channels. This is also in line with the idea of making the air guide region as smooth as possible in order to prevent an accumulation of dirt particles. In this context, it has also proven to be useful if the connection cables are made of unassembled cables, which can then be individually guided through the cable duct to the control electronics.

A fan disk can be provided between the air outlet and the motor for recombining the internal partial air flow with the outer partial air flow on the side of the fan disk facing away from the motor and for supplying the recombined air flow to the at least one air outlet. The arrangement of the fan disk ensures that the recombination of the outer partial air flow with the inner partial air flow first takes place on the end face of the fan disk facing away from the motor, so that penetration of dirt particles from the outer partial air flow into the inner partial air flow and thus into the interior of the motor is prevented.

The fan disk can have recombination contours which are suitable for directing the inner partial air flow radially outwards in the direction of the outer partial air flow and axially in the direction of the main flow direction. The design of the fan disk also causes a Venturi effect, whereby the outer partial air flow is actively pulled in the direction of the air outlet. With such a fan disk, flow rates between 800 and 900 liters per minute can be achieved.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
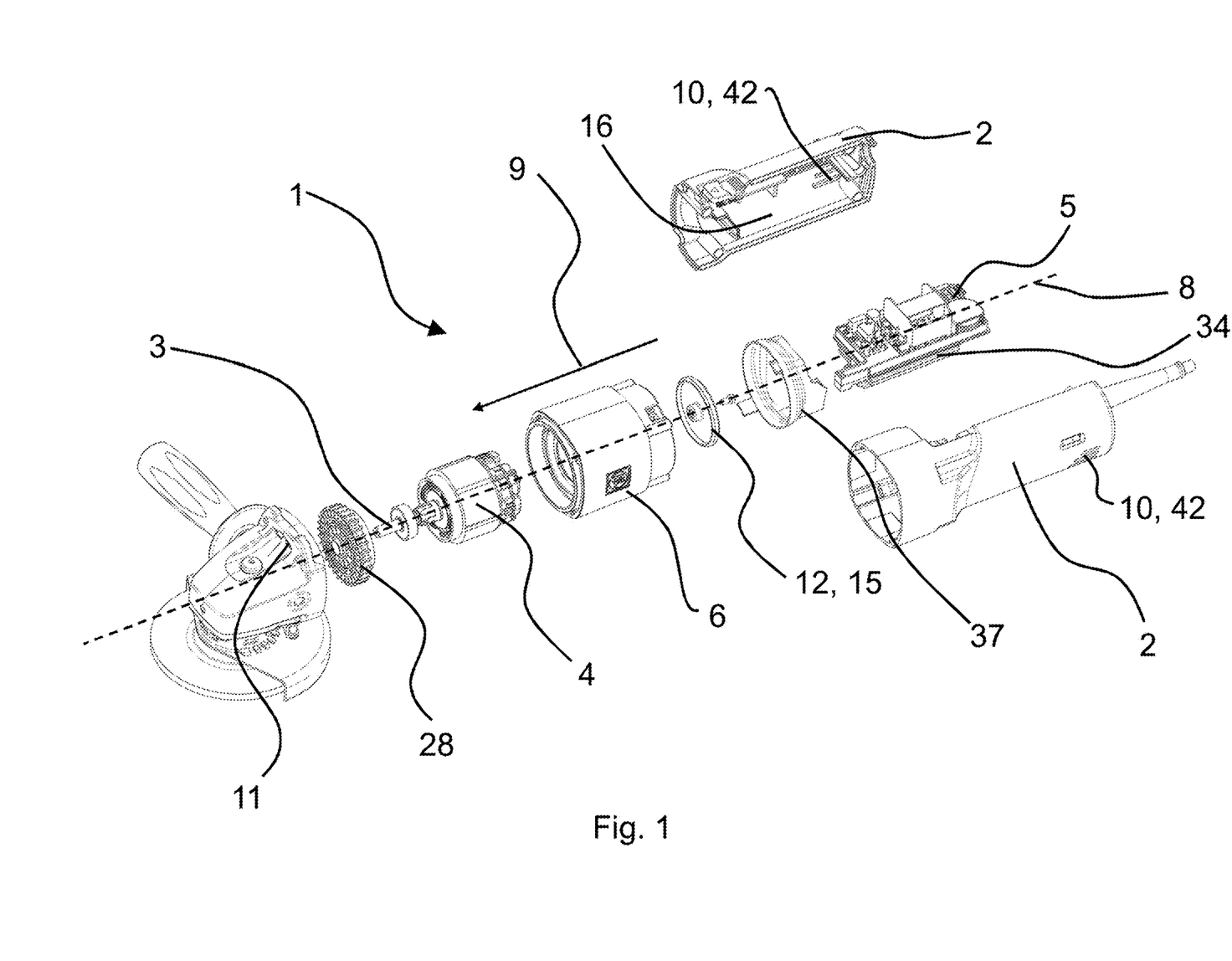
FIG. 1 is an exploded view of a hand held machine tool according to and embodiment of the invention.

FIG. 1 shows an exploded view of a hand held machine tool 1 according to the invention. The hand held machine tool 1 comprises a housing 2 with a motor housing 6, in which a motor 4 driving a rotor shaft 3 is accommodated, which is driven by a control electronics 5. An air guide region 7 is formed in the housing 2, through which cooling air can be guided to the motor 4 in a main flow direction 9 oriented substantially parallel to a motor longitudinal axis 8. The air guide region 7 is limited at one end by a plurality of air inlets 10 and a filter structure 42, and at the other end, by a plurality of air outlets 11. Ambient air, which serves as cooling air 10, is passed through the air inlets 10 into the interior of the housing 2 and passed out again from the housing 2 through the air outlets 11. In the air guide region 7—upstream of the motor 4—a separator 12 is arranged, by means of which it is possible to divide the cooling air into an outer partial air flow 13 flowing around the outside circumference of the motor 4, and an inner partial air flow 14 flowing through the motor 4. By means of the separator 12, it is thereby also achieved and ensured that the degree of contamination of the inner partial air flow 14 is less than the degree of contamination of the outer partial air flow 13. In the illustrated example, the separator 12 is formed as a separator disk 15 which is rotatably connected to the rotor shaft 3. A fan disk 28 is also arranged between the motor 4 and the air outlet 11, through which the cooling air is first drawn into the housing 2 and then directed out again through the air outlet 11. In the housing, an air guide structure 37 is located upstream of the separator 12, through which the path of the cooling air is flow-optimized.

Figure 2:
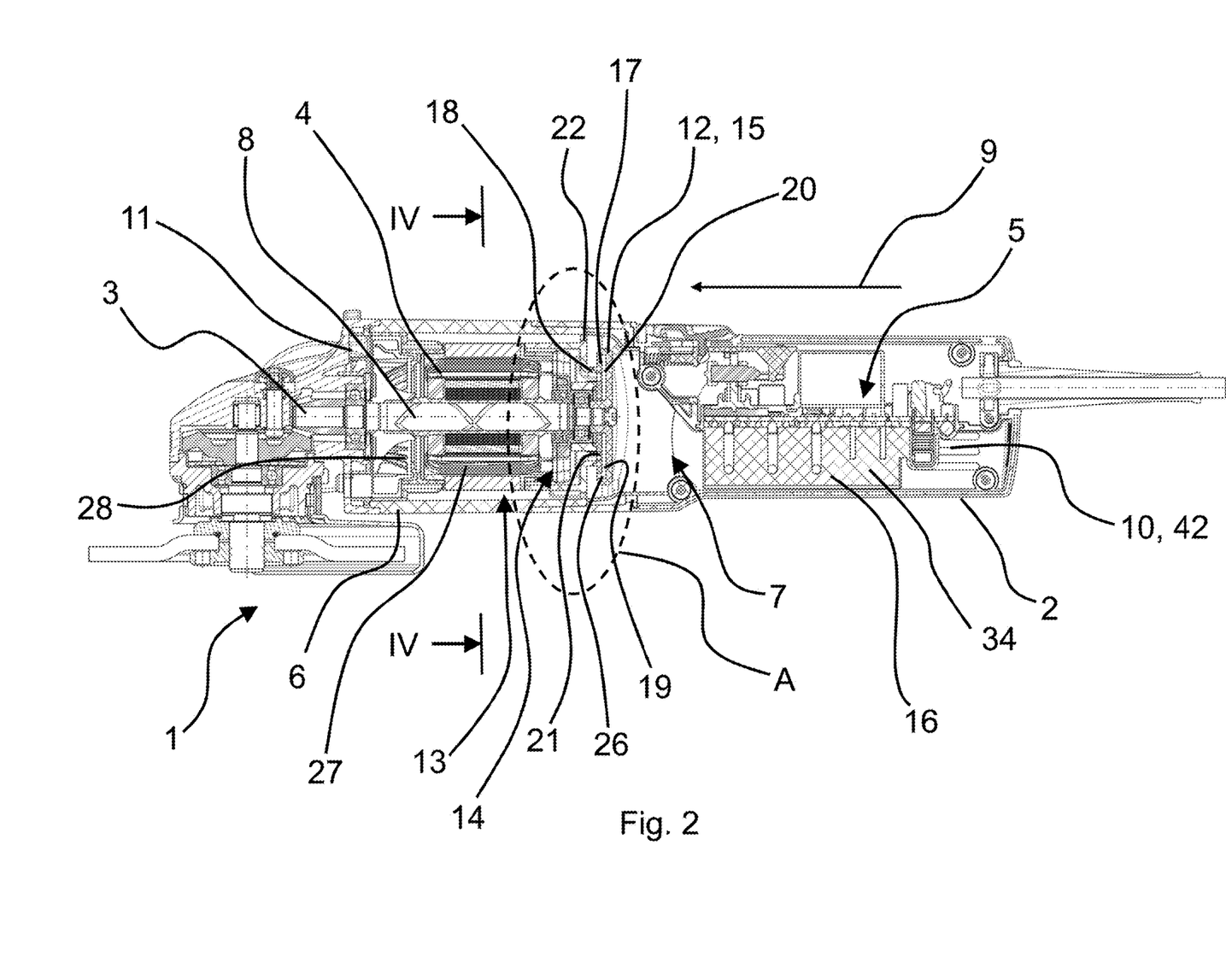
FIG. 2 is a longitudinal section through the hand held machine tool

The longitudinal section through the machine tool 1 shown in FIG. 2 in particular shows the path of the air guide region 7. In particular, it is also clear that in the illustrated embodiment, the control electronics 5 is spatially separated from the air guide region 7, and that an electronics cooling section 16 is formed between the air inlet 10 and the separator 12, in which a heat sink 34 connected in a thermally conductive manner with the control electronics 5 is arranged. As a result, the control electronics 5 are protected in a simple manner from dirt particles contained in the cooling air, and are at the same time cooled. The path of the outer partial air flow 13 and the inner partial air flow 14 will be explained in more detail below.

Figure 3:
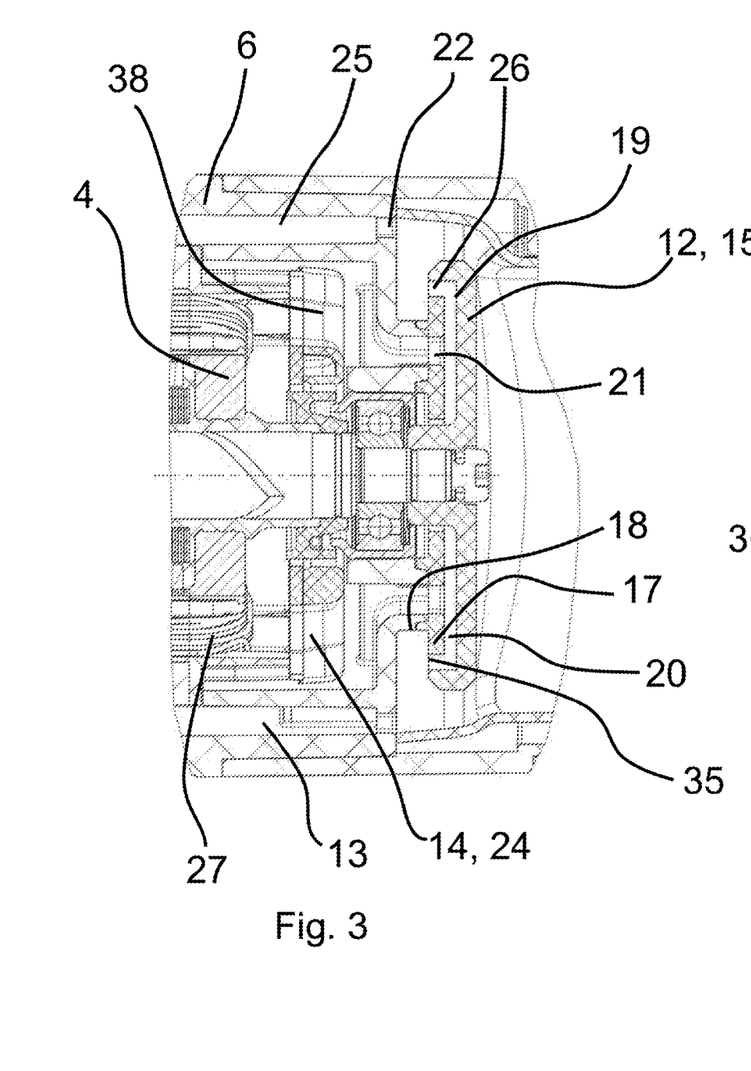
FIG. 3 is the detail A from FIG. 2.

As can be seen from detail A shown in FIG. 3, an extension 18 having an annular collar 17 is formed on the end face of the motor housing 6 facing the air inlet 10, in which a recess 19 formed on the separator disk 15 engages. As a result, an air gap 20 is formed between the motor housing 6 and the separator disk 15, through which the inner partial air flow 14 is guided into the interior of the motor 4. In the embodiment shown, the ratio between the width of the air gap 20 and the height of the air gap 20 is 3:4. In the embodiment shown, the ratio between the height of the extension 18 and the radial extent of the annular collar 17 is 4:3. This ensures that impurities cannot penetrate into the air gap 20 itself, but rather are transported away to the outside in the direction of the outer partial air flow 13. Between the motor housing 6 and the separator 12, a reversal region 26 is formed, in which the flow direction of the inner partial air flow 14 is directed counter to the main flow direction 9. By means of the separator 15, which is rotationally fixed to the rotor shaft 3, the dirt particles contained in the cooling air are directed radially outward and concentrated in the outer partial air flow 13. The inner partial air flow 14 is then supplied through the air gap 20 to the interior of the motor 4. By means of the reversal region 26, in which the direction of the inner partial air flow 14 is directed counter to the main flow direction 9, the penetration of dirt particles into the air gap 20 is prevented. The inlet 35 of the air gap 20 is radially spaced from the axial extent of the extension 18 by the radial extent of the annular collar 17, so that the dirt particles are fed to the outer partial air flow 13 and cannot penetrate into the air gap 20.

The cooling air flow divided by the separator disk 15 into the outer partial air flow 13 and into the inner partial air flow 14 is now directed into the interior of the motor housing 6 through inner openings 21 and outer openings 22 formed in the motor housing 6. The inner openings 21 and the outer openings 22 are each formed as ring-segmented slots 23. The inner partial air flow 14 is supplied to the motor 4 through the inner openings 21, and the outer partial air flow 13 through the outer openings 22. For this purpose, the inner openings 21 are in each case fluid-conductively connected to an inner overflow channel 24, whereas the outer openings 22 are in each case fluid-conductively connected to an outer overflow channel 25. The motor 4 is additionally protected by a motor cover 38 at its end facing the air inlet 10.

Figure 4:
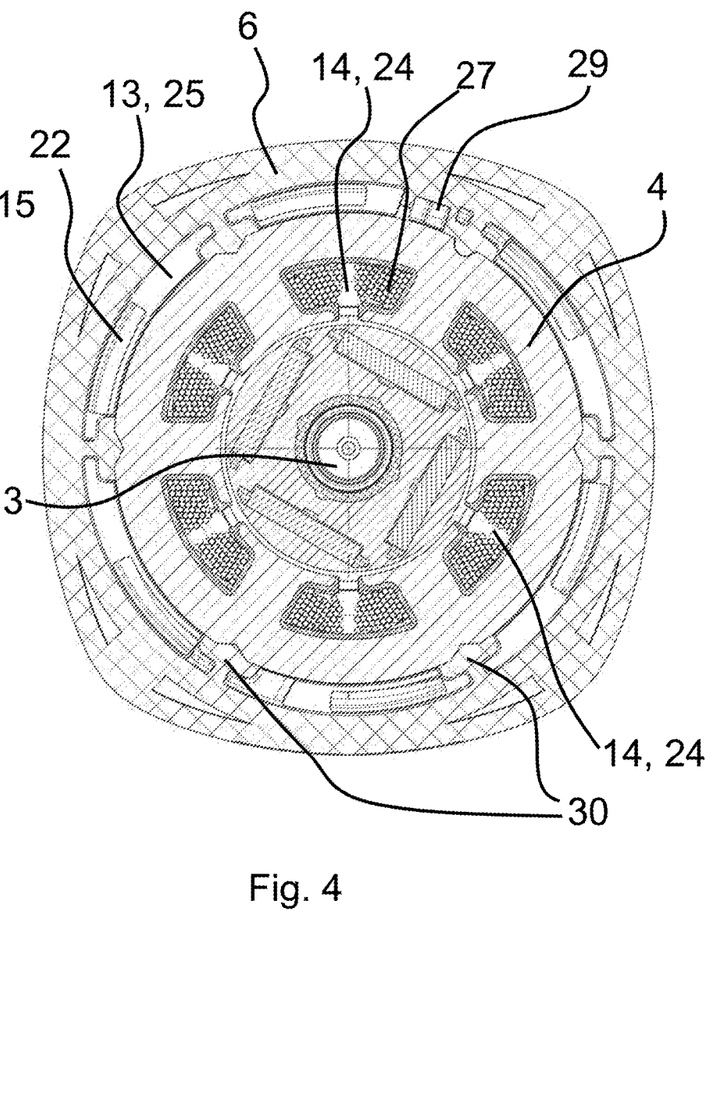
FIG. 4 is a cross section along the section IV-IV of FIG. 2.

As can be seen in the sectional view shown in FIG. 4 along the section IV-IV from FIG. 2, the inner overflow channels 24 are formed between the pole windings 27 of the motor 4. The outer overflow channels 25, however, are formed between the motor housing 6 and the outer circumference of the motor 4, whereby it is ensured that the dirt particles contained in the cooling air cannot get into the interior of the motor 4, but are guided past the outside of this. The individual outer overflow channels 25 are separated from one another by guide ribs 30, which additionally provide a guide for the motor 4 during assembly. In addition, this ensures a rotationally fixed connection of the stator of the motor 4 to the motor housing 6.

Figures 5, 6:
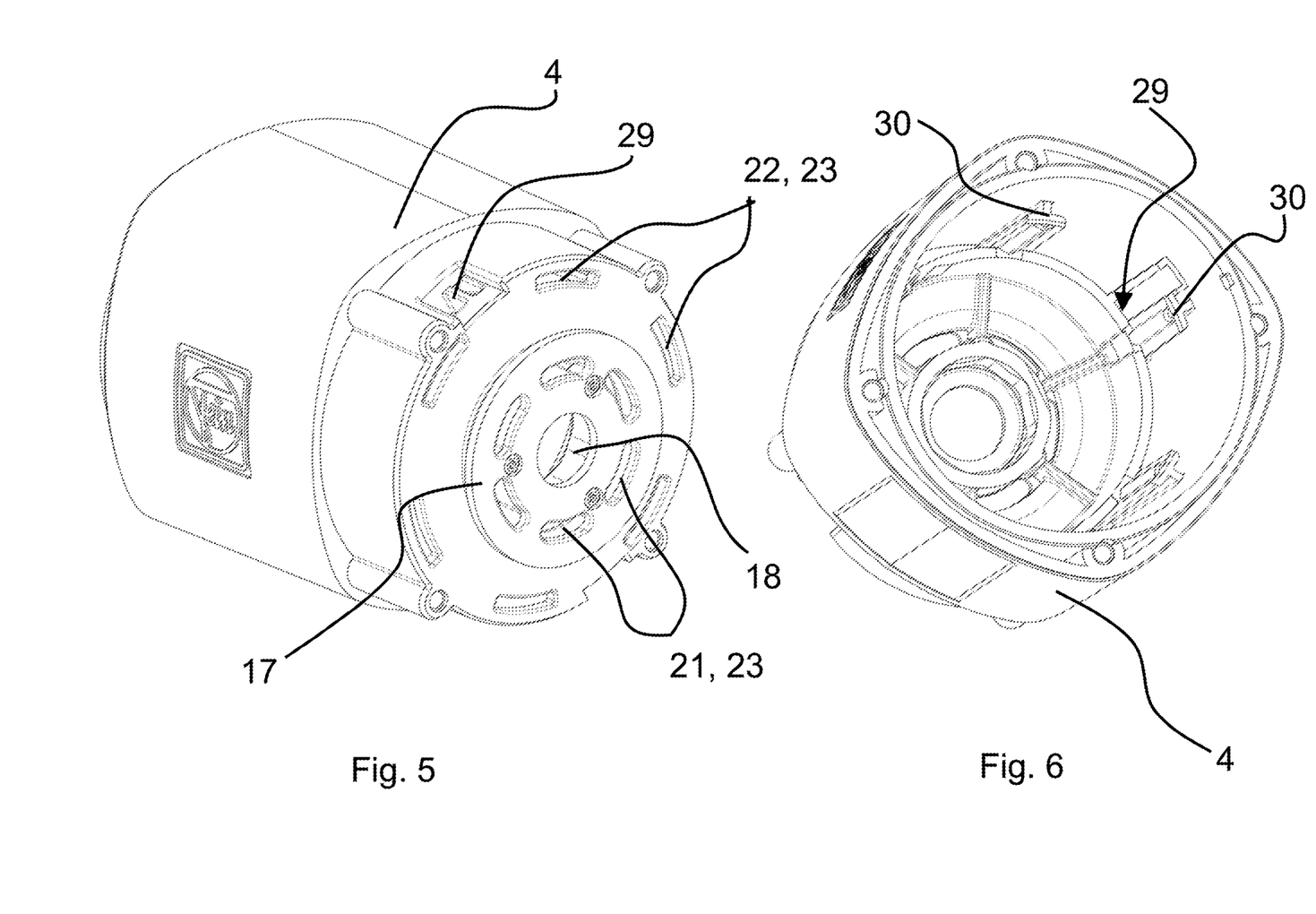
FIG. 5 is a first perspective view of the motor housing.
FIG. 6 is another perspective view of the motor housing.

In a perspective view, FIG. 5 shows the end face of the motor housing 6 facing the air inlets 10. The design of the extension 18 and of the annular collar 17 is also clarified by this view. Furthermore, the arrangement of the inner openings 21 and the outer openings 22 can be seen, which are formed in the embodiment shown as ring-segmented slots 23 and are evenly distributed on the end face of the motor housing 6. FIG. 5 also shows the end-side opening of a cable duct 29, which is formed in the motor housing 6 and is spatially separated from the outer partial air flow 13. Through this cable duct 29, the connection cables contacting the motor 4 can be led out of the motor housing 6 to the control electronics 5, without these coming into contact with the dirt particles contained in the outer partial air flow 13 of the cooling air. The path of this cable duct 29 in the interior of the motor housing 6 can be seen in particular from FIG. 6, which also shows the motor housing 6 in a perspective view from the side facing away from the air inlets 10. This view in particular also illustrates the guide ribs 30 formed on the inner circumferential side of the motor housing 6, onto which the motor 4 can be pushed and between which the outer overflow channels 25 are formed.

Figure 7:
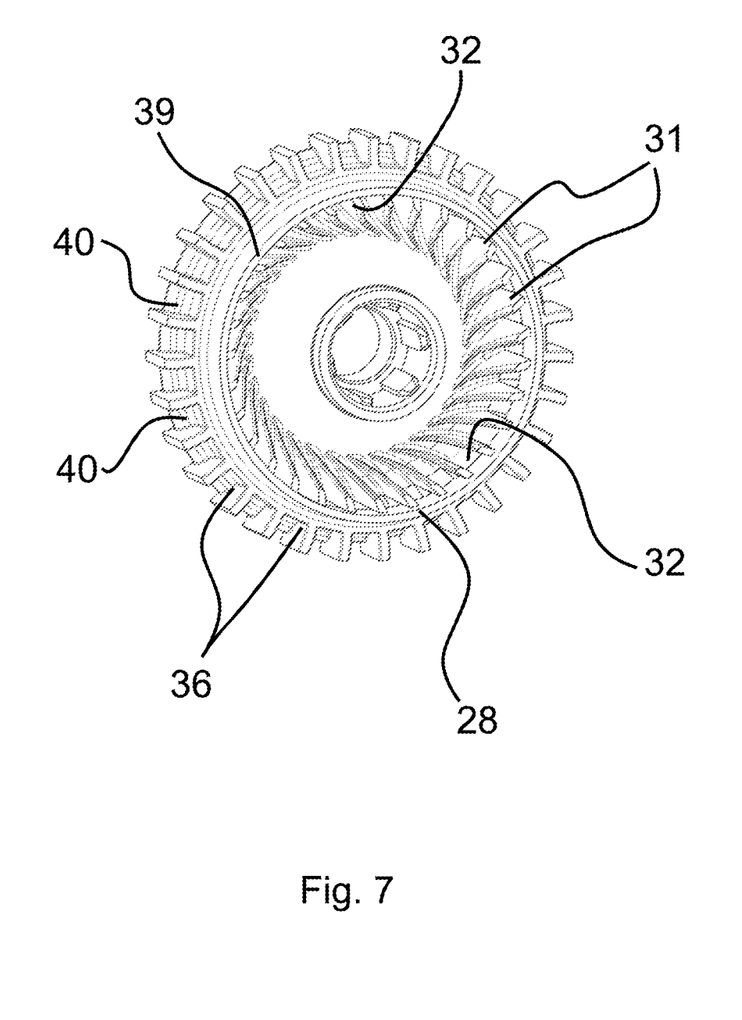
FIG. 7 is a perspective view of the fan disk in the main flow direction.
Figure 8:
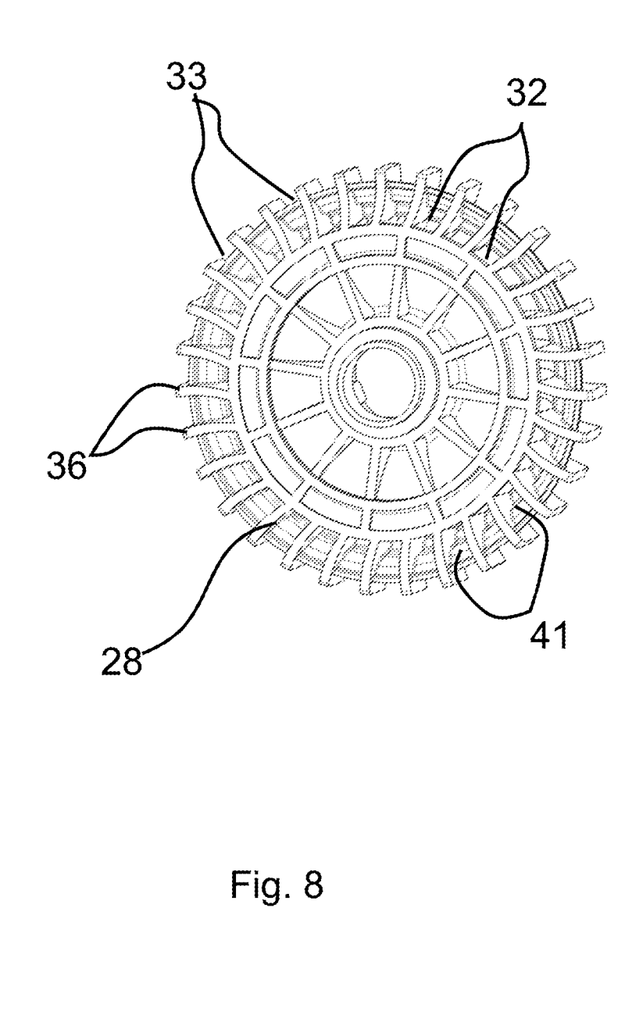
FIG. 8 is a perspective view of the fan disk counter to the main flow direction.

In a perspective view, FIG. 7 shows the end face of the fan disk 28 arranged between the motor 4 and the air outlet 11 facing the motor 4, and FIG. 8 shows the end facing away from the motor 4. The fan disk 28 has air guide elements 31 which guide the inner partial air flow 14 radially outward and recombine it with the outer partial air flow 13 on the end face of the fan disk 28 facing away from the motor 4. For this purpose, the fan disk 28 has openings 32 through which the inner partial air flow 14 coming from the interior of the motor 4 is guided to the outer partial air flow 13. The air guide elements 31 have a curvature and become higher towards the outside. As can be seen in particular from FIG. 8, the openings 32 lead into recombination contours 41, through which the inner partial air flow 14 is conducted radially outwards in the direction of the outer partial air flow 13 and combined with it. In addition, this ensures that an axial component of motion is impressed on the inner partial air flow 14 in the main flow direction 9. In the embodiment shown, passage openings 33 limited by ribbed arches 36 are formed in the radially outer region of the fan disk 28, through which the outer partial air flow 13 is led out of the air outlets 11. Between the ribbed arches 36, flow contours 40 are formed on the end face of the fan disk 28 facing the motor 4, which guide the outer partial air flow radially outward in the direction of the passage openings 33 and axially accelerate it by means of the associated cross-sectional reduction. In the exemplary embodiment shown, the air guide elements 31 are spatially separated from the passage openings 33 by a separator ring collar 39 in order to prevent recombination of the two partial air flows on the end face of the fan disk 28 facing the motor. Due to the special design of the individual circular sectors of the fan disk 28, an efficient recombination of the inner partial air flow 14 and the outer partial air flow 13 is ultimately achieved and the axial transport of the recombined air flow facilitated and thereby the total delivery of the fan system optimized.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A hand held machine tool for machining workpieces, the hand held machine tool comprising:
a housing in which a motor driving a rotor shaft is accommodated;
an air guide region formed in the housing for supplying cooling air to the motor along a main flow direction oriented substantially parallel to a motor longitudinal axis, the air guide region being limited at a first end by at least one air inlet and at a second end by at least one air outlet for discharging the cooling air from the housing; and
a separator arranged in the air guide region for dividing the cooling air into an outer partial air flow flowing around an outer peripheral side of the motor and into an inner partial air flow flowing through the motor, the separator being configured such that a degree of contamination of the outer partial air flow is greater than a degree of contamination of the inner partial air flow,
wherein the housing is formed in several parts and includes a motor housing accommodating the motor, wherein an end of the motor housing facing away from the motor has at least one inner opening for entry of the inner partial air flow and at least one outer opening for entry of the outer partial air flow, the at least one inner opening and the at least one outer opening being radially spaced apart from each other with respect to the motor longitudinal axis, such that in a radial direction, the at least one inner opening is positioned closer to the motor longitudinal axis than the at least one outer opening.

2. The hand held machine tool according to claim 1, wherein the separator is formed as a separator disk, which is arranged upstream of the motor in the main flow direction and is rotationally fixed to the rotor shaft.

3. The hand held machine tool according to claim 1, wherein an area ratio of the sum of areas of the at least one inner opening to a sum of areas of the at least one outer opening is between 1:1.5 and 1:0.75 or about 1:0.9.

4. The hand held machine tool according to claim 1, wherein the at least one inner opening and/or the at least one outer opening is formed as a ring-segmented slot.

5. The hand held machine tool according to claim 1, wherein the at least one inner opening is fluid-conductively connected with an inner overflow channel, and wherein the at least one outer opening is fluid-conductively connected with an outer overflow channel.

6. The hand held machine tool according to claim 5, wherein the inner overflow channel is formed between pole windings of the motor, and wherein the outer overflow channel is formed on the outer peripheral side of the motor.

7. The hand held machine tool according to claim 1, wherein at the end of the motor housing facing away from the motor, an extension having an annular collar is formed, and wherein an end face of the separator facing towards the motor has a recess accommodating the annular collar and that forms an air gap between the annular collar of the motor housing and the separator for guiding the inner partial air flow, wherein the inner partial air flow enters the air gap by an air gap inlet that is positioned underneath the separator on the end face of the separator facing towards the motor.

8. The hand held machine tool according to claim 7, wherein a ratio between a width of the air gap and a height of the air gap is 3:4, and wherein a ratio between a height of the extension and a radial extent of the annular collar is 4:3.

9. The hand held machine tool according to claim 7, wherein a diameter of the annular collar is smaller than a diameter of the separator.

10. The hand held machine tool according to claim 1, wherein a reversal region is formed between the housing and the separator, in which the flow direction of the inner partial air flow is counter to the main flow direction.

11. The hand held machine tool according to claim 1, wherein in a region of the at least one air inlet, a filter structure providing a filter function is arranged, and wherein openings of the filter structure have a size which is between 100 μm and 300 μm.

12. The hand held machine tool according to claim 1, wherein control electronics driving the motor is provided, which is separated from the air guide region, and wherein an electronics cooling section is formed between the at least one air inlet and the separator in which a heat sink connected in a thermally conductive manner with the control electronics is arranged.

13. The hand held machine tool according to claim 1, wherein a cable duct separated from the outer partial air flow is formed in the motor housing for channeling connection cables that contact the motor out from the motor housing.

14. The hand held machine tool according to claim 1, wherein a fan disk is provided between the at least one air outlet and the motor for recombining the inner partial air flow with the outer partial air flow on a side of the fan disk facing away from the motor and for supplying the recombined air flow to the at least one air outlet.

15. The hand held machine tool according to claim 14, wherein the fan disk has recombination contours which are suitable for guiding the inner partial air flow radially outward in the direction of the outer partial air flow and axially in the main flow direction.

16. The hand held machine tool according to claim 1, wherein the inner partial air flow and the outer partial air flow are both discharged out of the housing by the at least one air outlet.

17. The hand held machine tool according to claim 1, wherein the end of the motor housing facing away from the motor has an end face, wherein the at least one outer opening extends through the end face, wherein an extension protrudes perpendicularly from the end face in a direction towards the separator, a distal end of the extension having an annular collar connected thereto, the annular collar extending parallel to the end face, and wherein the at least one inner opening extends through the annular collar, such that with respect to an axial direction of the motor longitudinal axis, the at least one inner opening is positioned closer to the separator than the at least one outer opening.

* * * * *